United States Patent

[11] 3,555,988

| [72] | Inventor | Karl Wagner |
| | | Ottobrunn, Germany |
| [21] | Appl. No. | 728,997 |
| [22] | Filed | May 14, 1968 |
| [45] | Patented | Jan. 19, 1971 |
| [73] | Assignee | AGFA-Gevaert Aktiengesellschaft |
| | | Leverkusen, Germany |
| [32] | Priority | May 19, 1967 |
| [33] | | Germany |
| [31] | | A55756 |

[54] APPARATUS FOR IMAGE-TRANSFER PHOTOGRAPHY
12 Claims, 4 Drawing Figs.

[52] U.S. Cl. ................................................ 95/89, 95/13
[51] Int. Cl. ................................................ G03d
[50] Field of Search .......................................... 95/13, 14, 89 Misc, 89 Lam

[56] References Cited
UNITED STATES PATENTS

| 2,740,341 | 4/1956 | McCune | 95/13 |
| 2,862,428 | 12/1958 | Salter | 95/11 |
| 3,270,644 | 9/1966 | Finelli | 95/13 |
| 3,311,037 | 3/1967 | Winkler et al. | 95/11 |

Primary Examiner—John M. Horan
Assistant Examiner—Fred L. Braun
Attorney—Michael S. Striker ABSTRACT: A camera for image-transfer photography having a movably mounted first presser roller on the cover of the camera housing which is engaged by cams during movement of the cover to closed position for shifting the first pressure roller in a direction toward a second presser roller which is mounted in the body of the housing. The second presser roller or the cams are biased by springs to insure that at least one of the presser rollers will yield when the negative and positive webs are being withdrawn from the housing upon completion of an exposure and when the thickness of the laminated structure passing between the rollers increases.

PATENTED JAN 19 1971
3,555,988
SHEET 1 OF 2
Fig.1
Fig.4
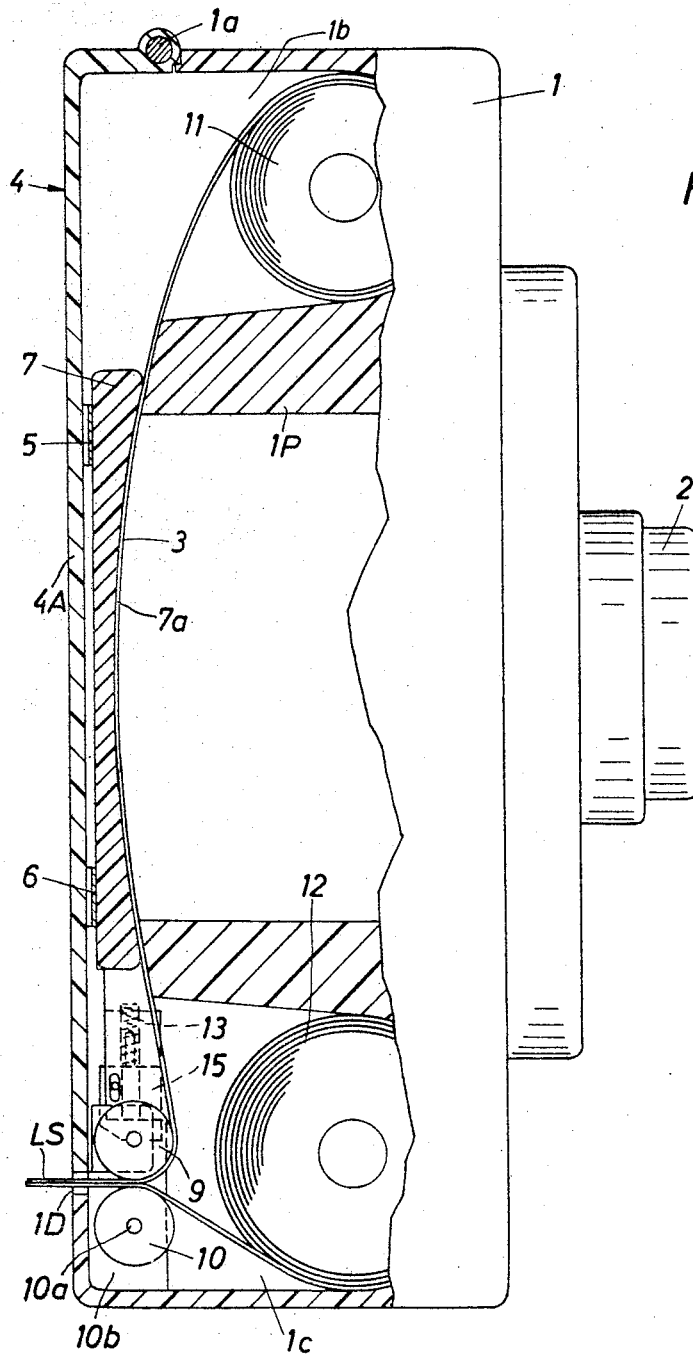
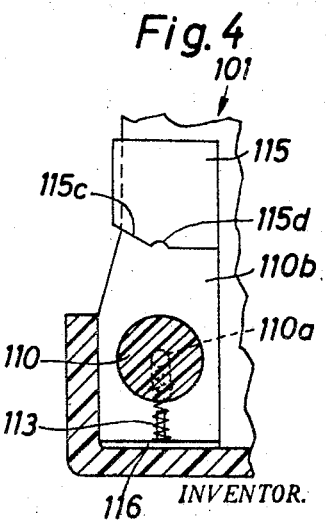
INVENTOR.
KARL WAGNER
BY Michael S. Striker
Attorney

INVENTOR.

KARL WAGNER 3,555,988

APPARATUS FOR IMAGE-TRANSFER PHOTOGRAPHY

BACKGROUND OF THE INVENTION

The present invention relates to apparatus for image-transfer photography. More particularly, the invention relates to improvements in such parts of an apparatus for image-transfer photography which cause a developing fluid to spread between the photosensitive negative web and the image-receptive positive web during extraction of an exposed length of negative web from the housing.

It is already known to produce photographic positives in accordance with the silver salt diffusion process by placing an exposed negative sheet or frame against an image receptive positive web or sheet which is coated with a pastelike or liquid developing fluid. The exposed halogen silver of the negative sheet is developed and the unexposed silver is dissolved and dispersed in the coating of the positive sheet to produce an image. As a rule, the exposed sheet of negative material is pressed against the positive sheet by passing therewith through the nip or gap between two presser rollers one of which is biased toward the other roller to insure uniform spreading of developing fluid.

In certain presently known apparatus for image-transfer photography, one of the presser rollers is mounted on the cover of the housing and is biased by springs to bear against the sheets when the cover is moved to closed position. The springs which bias the movable roller are mounted on the cover. The means for moving the cover to open position in order to permit reloading of the apparatus with fresh supplies of positive and negative material comprises a mechanism which retracts the springs for the movable roller so that the cover can be moved to open position while the movable roller is retracted, i.e., moved away from the other roller which is mounted in the main portion or body of the housing. In order to prevent excessive stressing of the cover in closed position, the just-mentioned conventional apparatus normally comprise an interlocking device which couples the bearing for the movable roller with the bearing for the other roller when the cover is moved to closed position. Such interlocking and resulting reduction of stresses upon the cover is of particular importance when the cover and/or the entire housing consists of synthetic plastic material. The interlocking device is complicated and occupies considerable space in the housing. Furthermore, the parts of the interlocking device must be machined with a high degree of precision which contributes to the initial cost of the apparatus.

SUMMARY OF THE INVENTION

It is an object of my invention to provide an apparatus for image-transfer photography wherein the stresses upon the housing during withdrawal of exposed negative material are reduced in a space- and material-saving way.

Another object of the invention is to provide a novel housing for apparatus of the just-outlined character and to provide a novel mounting and novel bearings and guide means for the rollers which press the negative and positive materials against each other to effect uniform distribution of developing fluid during extraction of an exposed frame from the housing.

A further object of the invention is to provide a housing wherein the bearings and guide means for the rollers can be mass produced in available machinery and wherein at least one of the rollers can yield when the gap between the rollers must permit passage of a thicker portion of the negative and/or positive sheet material.

The improved apparatus comprises a housing having chamber means for positive and negative sheet or web materials and defining a path along which such materials can be advanced toward an outlet provided in the housing, the housing comprising a first portion or body and a second portion or cover movable with reference to the body between open and closed positions in which it respectively affords access to and seals the chamber means, and novel compressing means for biasing the positive and negative materials against each other during advance along a predetermined portion or stretch of the aforementioned path. The compressing means comprises a first preferably roller-shaped presser member installed in the body at one side of the stretch, a second preferably roller-shaped presser member carried by the cover and being located at the other side of the stretch in closed position of the cover, the second presser member being movable with reference to the cover toward and away from the first presser member, and guide means provided in the body for moving the second presser member toward the first presser member in response to movement of the cover to closed position.

The guide means may include spring-biased guide members which define cam faces for the end portions of the second presser member. Alternatively, the guide members can be rigidly secured to the body and the compressing device then comprises springs which bias the first presser member toward the second presser member.

In accordance with another feature of my invention, the cover may comprise a substantially platelike outer wall which supports the second presser member and a pressure plate which is connected to the outer wall by springs and has a concave surface adjacent to a portion of the path along which the negative sheet material advances from the chamber means toward the presser members.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a longitudinal vertical sectional view of an apparatus which embodies one form of my invention, the cover of the housing being shown in closed position;

FIG. 4 is a fragmentary sectional view of a modified apparatus.

DESCRIPTION OF THE PREFERRED EMBODIMENTS

Figure 2:
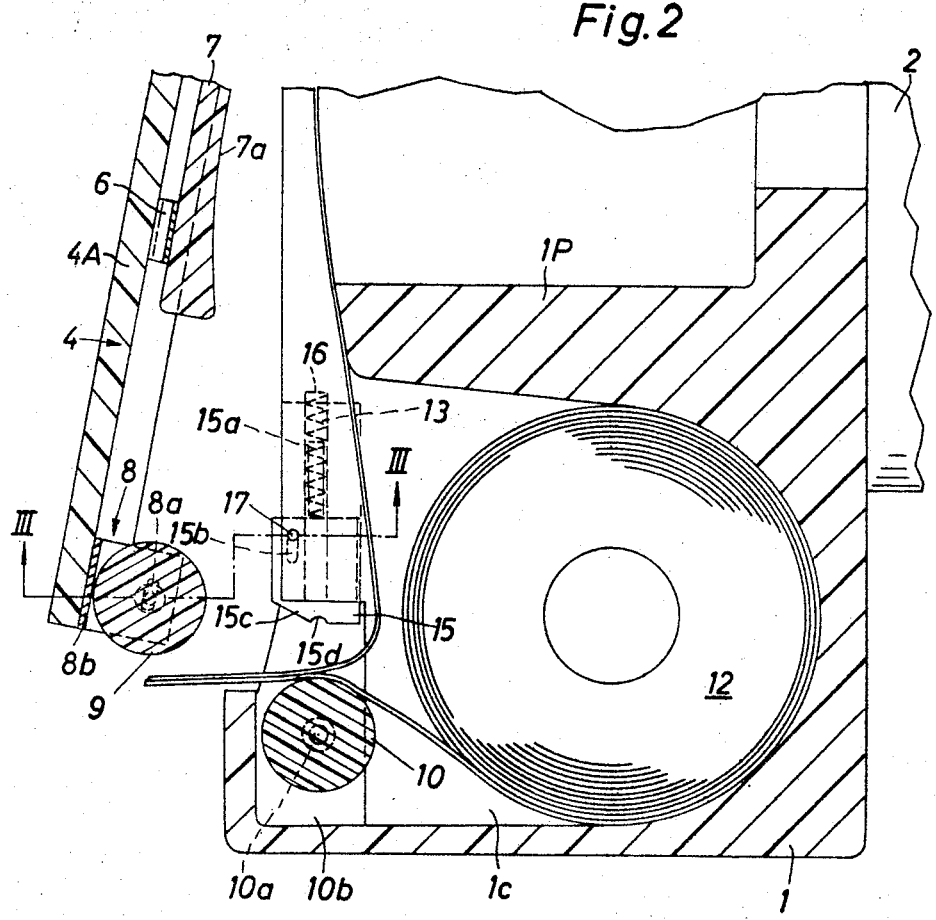
FIG. 2 is a larger scale view of the lower portion of the apparatus, with the cover shown in open position.

FIG. 1 illustrates certain parts of an apparatus for image-transfer photography. The front wall of the camera housing carries a lens mount 2 which focusses the image of a subject or scene into the curved plane 3 of an unexposed photosensitive frame forming part of a web which is convoluted to form a roll 11. Many standard parts of the camera, such as the shutter, release trigger, range finder, view finder, shutter adjusting means and others are not shown in the drawing because their construction and/or operation forms no part of the present invention.

The housing of the apparatus comprises a first portion or body 1 and a second portion or cover 4 which is connected to the body 1 by a hinge 1a for movement between the closed position of FIG. 1 and the open or partly open position of FIG. 2. The housing defines two chambers 1c, 1b which are accessible when the cover 4 is moved to the open position. The chamber 1b accommodates the aforementioned roll 11 of unexposed negative material and the chamber 1c accommodates a second roll 12 of image receptive positive material which carries pods (not shown) of processing fluid. The cover 4 comprises a flat outer wall 4A of plastic material and an inner wall 7 which constitutes a pressure plate and is connected to the outer wall be leaf springs 5, 6 so that it can move, within limits, toward and away from the outer wall. When the cover 4 is moved to the closed position of FIG. 1, it confines the rolls 11, 12 in their respective chambers 1b, 1c and its pressure plate 7 defines with the adjoining lateral portions of the body 1 a path for advance of negative web material toward an outlet 1D provided in the body 1 in the region adjacent to the chamber 1c.

The pressure plate 7 has a concave front surface 7a which defines a portion of the path for the web which is being withdrawn from the roll 11. An advantage of such configuration of the surface 7a is that it corrects the image field of the objective and improves the guidance of negative web material during advance toward the outlet 1D. Still further, the pressure plate 7 contributes to the eye-pleasing appearance of the cover 4 when the latter is moved to open position because its lower edge portion is sufficiently remote from the outer wall 4A to provide ample room for a presser member 9 which is mounted on the outer wall at a level below the pressure plate, i.e., below the lower leaf spring 6.

The lower portion of the outer wall 4A (as viewed in FIG. 1 or 2) carries a U-shaped bearing bracket 8 which is rigidly secured thereto and whose flanges 8b extend inwardly from the outer wall and are provided with elongated slots 8a for the tips 9b (FIG. 3) of end portions or stubs 9a of the presser member 9. The latter is a roller which may consist of rubber or synthetic plastic material and is movable with reference to the cover 4 to the extent determined by the length of slots 8a. These slots are parallel to the plane of the outer wall 4a. The presser member 9 forms part of a compressing device which serves to press the webs coming from the rolls 11, 12 against each other in that stretch of the path for these webs which is located upstream of the outlet 1D and is flanked by the roller 9 from one side and by a second presser member or roller 10 from the other side. The roller 10 has end portions or stubs 10a which are rotatable in bearing plates 10b permanently installed in or rigidly secured to the body 1. When the cover 4 is moved to the closed position of FIG. 1, the axes of the presser rollers 9, 10 are parallel to each other and the peripheral surfaces of these rollers respectively bear against the webs of exposed negative and image-receptive material to spread the processing fluid between the adjoining sides of such webs before the laminated structure LS issues from the outlet 1D.

The aforementioned compressing device further comprises a pair of guide members 15 which are movably mounted in the body 1 and serve to move the roller 9 toward the roller 10 in response to movement of the cover 4 to closed position. These guide members 15 are reciprocable toward and away from the stubs 10a of the roller 10 and are biased toward the respective stubs by resilient elements here shown as helical springs 13. Each guide member 15 is coupled to the body 1 by a pin-and-slot connection 17, 15b. The pins 17 of these connections are rigid with the body 1.

The body 1 further accommodates two retainers 16 which are rigidly secured thereto and serve as abutments for the upper ends of springs 13. In accordance with a presently preferred embodiment of my invention, the retainers 16 are rigid or integral with the aforementioned bearing plates 10b for the stubs 10a of the roller 10. Each guide member 15 has an upwardly extending centering pin 15a which extends into and guides the respective helical spring 13. Furthermore, each guide member 15 is provided with a cam face 5c which slopes upwardly from the roller 10 and is provided with a relatively shallow recess or notch 15d located directly above the axis of the roller 10. The planes of the cam faces 15c are normal to the axis of the roller 9, see FIG. 3. In order to prevent penetration of light into the housing, the outlet 1D preferably accommodates sealing strips of felt or elastic material, hingedly connected flaps or other suitable means for preventing uncontrolled entry of light.

Figure 3:
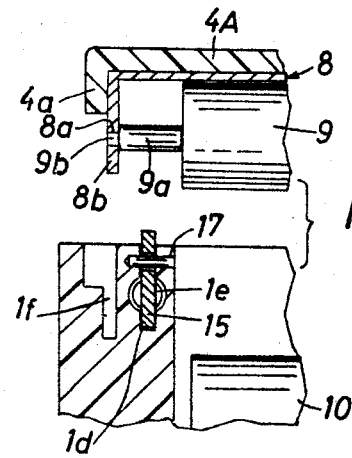
FIG. 3 is a sectional view as seen in the direction of arrows from the line iii–iii of FIG. 2.

As shown in FIG. 3, the guide member 15 is received in an is reciprocable with reference to a channel 1d provided in the body 1, and this channel 1d has an extension 1e of circular outline for the respective helical spring 13. The axis of the spring 13 is normal to the axes of the rollers 9, 10 and is coplanar with such axes when the cover 4 is moved to the closed position of FIG. 1. The cannel 1d is adjacent to a second channel 1f in the body 1; this second channel receives a bent over marginal portion 4a of the outer wall 4A to prevent uncontrolled entry of light into the housing. The channel 1f also accommodates portions of flanges 8b on the bearing bracket 8 for the roller 9 when the cover 4 is moved to closed position.

Each guide member 15 is preferably stamped out of sheet metal and resembles a flat plate. These guide members are mirror symmetrical with reference to a central vertical plane of the apparatus. The aforementioned pin-and-slot connections 15b, 17 prevent ejection of guide members 15 from the body 1 when the cover 4 is moved to the open position of FIG. 2. The bearing plates 10b for the roller 10 may also consist of sheet metal stock and the aforementioned retainers 16 for the upper end convolutions of springs 13 may form integral parts of such bearing plates. This reduces the likelihood of deformation of the body 1 when the cover 4 is moved toward closed position. Such reduction of stresses upon the body 1 is of particular importance when the housing consists of synthetic plastic material. The bearing plates 10b can be permanently embedded in or inserted into and fixedly secured in slots or recesses provided therefor in the body 1.

It is clear that the body 1 and cover 4 may be provided with suitable detent means or locking means for preventing uncontrolled opening of the cover in response to a pull upon the laminated structure LS in order to withdraw an exposed frame from the housing. For example, a locking device may be provided to establish a separable connection between the lateral portions 4a of the outer wall 4A and the adjoining portions of the body 1. Such locking device should be strong enough to prevent unintentional withdrawal of stubs 9a from the corresponding notches or recesses 15d when the user of the apparatus exerts a pull in order to withdraw an exposed frame of the negative web material by way of the outlet 1D. The locking device may include a handle to facilitate movement of the cover 4 to open position. Of course, the apparatus of FIGS. 1 to 3 further comprises suitable blocking means for arresting the rolls 11, 12 upon extraction of an exposed film frame, i.e., for preventing withdrawal of unexposed frames. Such blocking means are well known in the art and, therefore, are not shown in the drawing.

An important advantage of the structure shown in FIGS. 1 to 3 is that the forces which are necessary to bias the presser rollers 9, 10 against each other in closed position of the cover 4 need not bring about any stressing of the cover. Therefore, the outer wall 4A may consist of relatively thin synthetic plastic material. The bearing bracket 8 is not stressed when the springs 13 bias the roller 9 toward the roller 10 because the stresses are taken up by the retainers 16 and by the bearing plates 10b for the roller 10.

The operation is as follows:

In order to insert fresh rolls of negative and positive material, the user of the apparatus moves the cover 4 to the open position by pivoting the cover in a clockwise direction, as viewed in FIG. 1. Such pivoting of the cover 4 must be receded by opening or release of the aforementioned locking device. During opening of the cover, the user must overcome the resistance of springs 13 which bias the guide members 15 against the respective stubs 9a of the roller 9, i.e., the user must forcibly extract portions of the stubs 9a from the recesses 15d in the cam faces 15c. The chambers 1b and 1c are then accessible so that the user can insert a fresh roll 11 into the chamber 1b and a fresh roll 12 into the chamber 1c. The leaders of such rolls are normally connected to each other to facilitate manipulation. The foremost portion of the web of negative material is placed adjacent to the platform 1P in the body 1 and the foremost portion of positive material is placed over the roller 10. The leader is threaded through the outlet 1D.

In order to return the cover 4 to the closed position of FIG. 1, the user pivots it in a counterclockwise direction, as viewed in FIG. 2, whereby the stubs 9a of the roller 9 move against and travel along the cam faces 15c so as to move the roller 9 downwardly toward the roller 10. At the same time, the stubs 9a cause the guide members 15 to move away from the roller 10 until they snap into the corresponding recesses 15d. This completes the closing of the cover 4 and the aforementioned locking device is actuated to prevent unintentional opening.

The user then makes an exposure in the customary way and thereupon exerts a pull upon the leader of the negative and positive webs in order to withdraw the exposed frame of the negative web and a corresponding length of the positive web by way of the outlet 1D. During such withdrawal, the peripheral surfaces of the rollers 9, 10 press the underside of the negative web against the upper side of the positive web and cause a pod to burst so that the developing fluid spills from the pod and spreads between the upper and lower sides of the two webs. The aforementioned blocking device prevents further withdrawal of the webs when the exposed frame is fully withdrawn by way of the outlet 1D.

An important advantage of the guide members 15 and springs 13 is that they permit the roller 9 to move toward and away from the roller 10 during withdrawal of an exposed frame. In other words, the roller 9 can yield when the thickness of the laminated structure passing through the gap between the rollers 9, 10 increases, for example, when the pod with developing fluid is to be moved through such gap. The bias of springs 13 is strong enough to insure that the pod bursts and that it spills its contents along the adjacent sides of the webs during extraction from the housing. Furthermore, the springs 13 insure uniform distribution of developing fluid between the adjoining sides of the webs during extraction of an exposed frame of the negative web. The springs 13 also permit the roller 9 to yield shortly before the withdrawal of an exposed frame is completed, i.e., at a time when the gap between the rollers 9, 10 accommodates and permits passage of a receptacle for surplus developing fluid.

FIG. 4 illustrates a portion of a modified apparatus wherein the roller 110 (corresponding to the roller 10 of FIGS. 1 to 3) is biased by helical springs 113 in a direction toward two fixedly mounted guide members 115 (only one shown). The guide member 115 are rigid with bearings 110b for the stubs 110a of the roller 110, and these bearings are provided with integral or rigidly mounted retainers 116 for the lower ends of springs 113. The springs 13 are not needed. The cam faces 115c of the guide members cause the roller 9 (not shown) to move toward the roller 110 when the cover is moved to closed position and the stubs 9a of the roller 9 ultimately enter the recesses or notches 115d of the guide members 15 when the cover 4 reaches its closed position. Such entry of stubs 9a into the notches 115d is insured by springs 113 which are free to move the roller 110 upwardly as soon as the cover reaches its closed position. In contradistinction to the operation of the previously described apparatus, the springs 113 permit the roller 110 to yield and to move downwardly when the gap or nip the rollers 9, 110 accommodates a relatively thick portion of the laminated structure including the positive and negative webs. The guide members 115 preferably consist of stamped sheet metal stock and can be made in one piece with the corresponding bearings 110a and retainers 116. The bearings 110a and the guide members 115 are inserted into and fixedly mounted in suitable recesses or channels of the body 101.

It is further clear that the improved structure can be embodied in photographic apparatus wherein the rolls 11, 12 are replaced by a single roll which includes a web of positive film, a web or individual sheets of negative film and pads with developing fluid between the two webs. Reference may be had to U.S. Pat. No. 3,270,642 to Nerwin or to the copending application Ser. No. 677,525 to Schmidt et al. filed Oct. 24, 1967 and assigned to the same assignee.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

I claim:

1. In an apparatus for image-transfer photography, a combination comprising a housing having chamber means for positive and negative web materials and defining a path along which such materials can be advanced toward an outlet provided in the housing, said housing comprising a first portion and a second portion movable with reference to the first portion between open and closed positions in which it respectively affords access to and seals said chamber means; and compressing means for biasing the positive and negative materials against each other during advance along a predetermined stretch of said path, said compressing means comprising a first presser member installed in said first portion at one side of said stretch, a second presser member carried by said second portion and being located at the other side of said stretch in closed position of said second portion, said first presser member being movable with reference to said first portion toward and away from said second presser member in the closed position of said second portion and said second presser member being movable with reference to said second portion toward and away from said first presser member, means for biasing said first presser member toward said second presser member, and guide means provided in said first portion for moving said second presser member toward said first presser member in response to movement of said second portion to closed position.

2. A combination as defined in claim 1, wherein said guide means is rigid with said first portion.

3. A combination as defined in claim 2, wherein said compressing means further comprises retainer means for said biasing means, said retainer means being rigid with said guide means.

4. In an apparatus for image-transfer photography, a combination comprising a housing having chamber means for positive and negative web materials and defining a path along which such materials can be advanced toward an outlet provided in the housing, said housing comprising a first portion and a second portion movable with reference to the first portion between open and closed positions in which it respectively affords access to and seals said chamber means; and compressing means for biasing the positive and negative materials against each other during advance along a predetermined stretch of said path, said compressing means comprising a first presser member installed in said first portion at one side of said stretch, a second presser member carried by said second portion and being located at the other side of said stretch in closed position of said second portion, said second presser member being movable with reference to said second portion toward and away from said first presser member, and guide means provided in said first portion for moving said second presser member toward said first presser member in response to movement of said second portion to closed position, said guide means comprising at least one guide member mounted in said first portion for movement toward and away from said first presser member and resilient means for biasing said guide member toward said first presser member, said guide member being engaged by said second presser member and being thereby moved away from said first presser member at least during a portion of movement of said second portion toward closed position.

5. In an apparatus for image-transfer photography, a combination comprising a housing having chamber means for positive and negative web materials and defining a path along which such materials can be advanced toward an outlet provided in the housing, said housing comprising a first portion including two sidewalls and a second portion movable with reference to the first portion between open and closed positions in which it respectively affords access to and seals said chamber means; and compressing means for biasing the positive and negative materials against each other during advance along a predetermined stretch of said path, said compressing means comprising a first presser member installed in said first portion at one side of said stretch, a roller-shaped second presser member carried by said second portion and being located at the other side of said stretch in closed position of said second portion, said second presser member having two end portions each adjacent to one of said sidewalls in the closed position of said second portion and said second presser member being movable with reference to said second portion toward and away from said first presser member, and guide means provided in said first portion for moving said second presser member toward said first presser member in response to movement of said second portion to closed position, said guide means comprising a pair of guide members each mounted on one of said sidewalls and movable toward and away from said first presser member and resilient elements biasing said guide members toward said first presser member, the end portions of said roller being arranged to engage and to displace the respective guide members in a direction away from said first presser member during movement of said second portion to closed position.

6. A combination as defined in claim 5, wherein said resilient elements are helical springs.

7. A combination as defined in claim 5, wherein each of said guide members has a cam face located in a plane which is substantially normal to the axis of said roller and sloping toward said first presser member, said end portions of the roller being arranged to travel along the respective cam faces during movement of said second portion to closed position.

8. A combination as defined in claim 7, wherein each of said cam faces is provided with a notch which accommodates the respective end portion of the roller in closed position of said second portion.

9. A combination as defined in claim 8, wherein the end portions of said roller are two coaxial stubs.

10. In an apparatus for image-transfer photography, a combination comprising a housing having chamber means for positive and negative web materials and defining a path along which such materials can be advanced toward an outlet provided in the housing, said housing comprising a first portion and a second portion movable with reference to the first portion between open and closed positions in which it respectively affords access to and seals said chamber means; and compressing means for biasing the positive and negative materials against each other during advance along a predetermined stretch of said path, said compressing means comprising a first presser member installed in said first portion at one side of said stretch, a second presser member carried by said second portion and being located at the other side of said stretch in closed position of said second portion, said second presser member being movable with reference to said second portion toward and away from said first presser member, and guide means provided in said first portion for moving said second presser member toward said first presser member in response to movement of said second portion to closed position, said guide means comprising at least one guide member mounted in said first portion for movement toward and away from said first presser member and coupling means connecting said guide member to said first portion.

11. A combination as defined in claim 10, wherein said coupling means comprises a pin-and-slot connection.

12. In an apparatus for image-transfer photography, a combination comprising a housing having chamber means for positive and negative web materials and defining a path along which such materials can be advanced toward an outlet provided in the housing, said housing comprising a first portion and a second portion movable with reference to the first portion between open and closed positions in which it respectively affords access to and seals said chamber means; and compressing means for biasing the positive and negative materials against each other during advance along a predetermined stretch of said path, said compressing means comprising a first presser member installed in said first portion at one side of said stretch, bearing means for said first presser member, a second presser member carried by said second portion and being located at the other side of said stretch in closed position of said second portion, said second presser member being movable with reference to said second portion toward and away from said first presser member, and guide means provided in said first portion for moving said second presser member toward said first presser member in response to movement of said second portion to closed position, said guide means comprising at least one guide member movable in said first portion toward and away from said first presser member, resilient means for biasing said guide member toward said first presser member, and retainer means for said resilient means, said bearing means being fixedly secured to said first portion and being rigid with said retainer means.